(12) United States Patent
Verma et al.

(10) Patent No.: US 11,788,655 B2
(45) Date of Patent: Oct. 17, 2023

(54) TUBE COUPLING

(71) Applicant: General Electric Company, Schenectady, NY (US)

(72) Inventors: Naleen Kumar Verma, Bengaluru (IN); Omkar Topkar, Bengaluru (IN); Dharmaraj Pachaiappan, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/478,346

(22) Filed: Sep. 17, 2021

(65) Prior Publication Data
US 2023/0022280 A1    Jan. 26, 2023

(30) Foreign Application Priority Data
Jul. 20, 2021    (IN) .............................. 202111032592

(51) Int. Cl.
*F16L 27/04*    (2006.01)

(52) U.S. Cl.
CPC .................................... *F16L 27/04* (2013.01)

(58) Field of Classification Search
CPC ....................................................... F16L 27/04
See application file for complete search history.

(56) References Cited

U.S. PATENT DOCUMENTS 1,193,483 A * 8/1916 Parker .................... F16L 27/04
                                                    285/261
2,457,105 A * 12/1948 Patterson ................ F16L 37/52
                                                    285/364
(Continued)

FOREIGN PATENT DOCUMENTS

CN    107489831 A    12/2017
DE        413263 C  *  5/1925
(Continued)

OTHER PUBLICATIONS

Sargent Aerospace & Defense, "Case Study: Designing in Long Term Reliabilty and Fuel Efficiencies with Airtomic Ducting Solutions," pp. 1-5 (2011).

(Continued)

*Primary Examiner* — Zachary T Dragicevich
*Assistant Examiner* — James A Linford
(74) *Attorney, Agent, or Firm* — Venable LLP; Elizabeth C. G. Gitlin; Michele V. Frank

(57) ABSTRACT

A tube coupling for coupling a first tube and a second tube includes an inner shroud located circumferentially around a first tube distal end at an inner shroud distal end, the inner shroud distal end having one or more radial teeth, an outer shroud having a first outer shroud distal end and a second outer shroud distal end, the first outer shroud distal end located circumferentially around a second tube distal end and the second outer shroud distal end located circumferentially around the inner shroud distal end, and a band configured to elastically compress the first outer shroud distal end onto the inner shroud distal end. The band elastically compresses the first outer shroud distal end and the inner shroud distal end such that the one or more radial teeth are swaged into an outer surface of the first tube.

20 Claims, 12 Drawing Sheets

(56) References Cited

U.S. PATENT DOCUMENTS

| | | | | |
|---|---|---|---|---|
| 2,556,659 | A | * | 6/1951 | Patterson ............... F16L 37/52 |
| | | | | 285/317 |
| 2,702,716 | A | * | 2/1955 | Basolo ................. F16L 21/022 |
| | | | | 285/369 |
| 2,890,900 | A | * | 6/1959 | Williamson, Jr. .... F16L 33/221 |
| | | | | 285/330 |
| 4,666,192 | A | * | 5/1987 | Zamora ................. F16L 47/04 |
| | | | | 285/918 |
| 5,611,577 | A | | 3/1997 | Meyer et al. |
| 5,722,702 | A | * | 3/1998 | Washburn ............. F16L 37/091 |
| | | | | 285/369 |
| 6,517,126 | B1 | | 2/2003 | Peterson et al. |
| 9,194,514 | B2 | | 11/2015 | McKay |
| 9,869,413 | B2 | | 1/2018 | Laakso et al. |
| 9,982,813 | B2 | | 5/2018 | Dobmeier et al. |
| 2010/0254758 | A1 | | 10/2010 | Campbell et al. |
| 2015/0192230 | A1 | | 7/2015 | Jenkins et al. |
| 2016/0305584 | A1 | | 10/2016 | Delmer |

FOREIGN PATENT DOCUMENTS

| | | |
|---|---|---|
| DE | 202014100764 U1 | 3/2014 |
| DE | 202017106289 U1 | 10/2017 |
| EP | 0632224 A2 | 1/1995 |
| EP | 2837868 A1 | 2/2015 |
| KR | 20030050317 A | 6/2003 |
| WO | 1998008017 A2 | 2/1998 |
| WO | 2013063715 A1 | 5/2013 |
| WO | 2018236693 A1 | 12/2018 |

OTHER PUBLICATIONS

Parker Hannifin Corporation, "Phastite® for Pipe Connection System: A Non-Welded System for High-Pressure Piping," pp. 1-6 (2013).

* cited by examiner

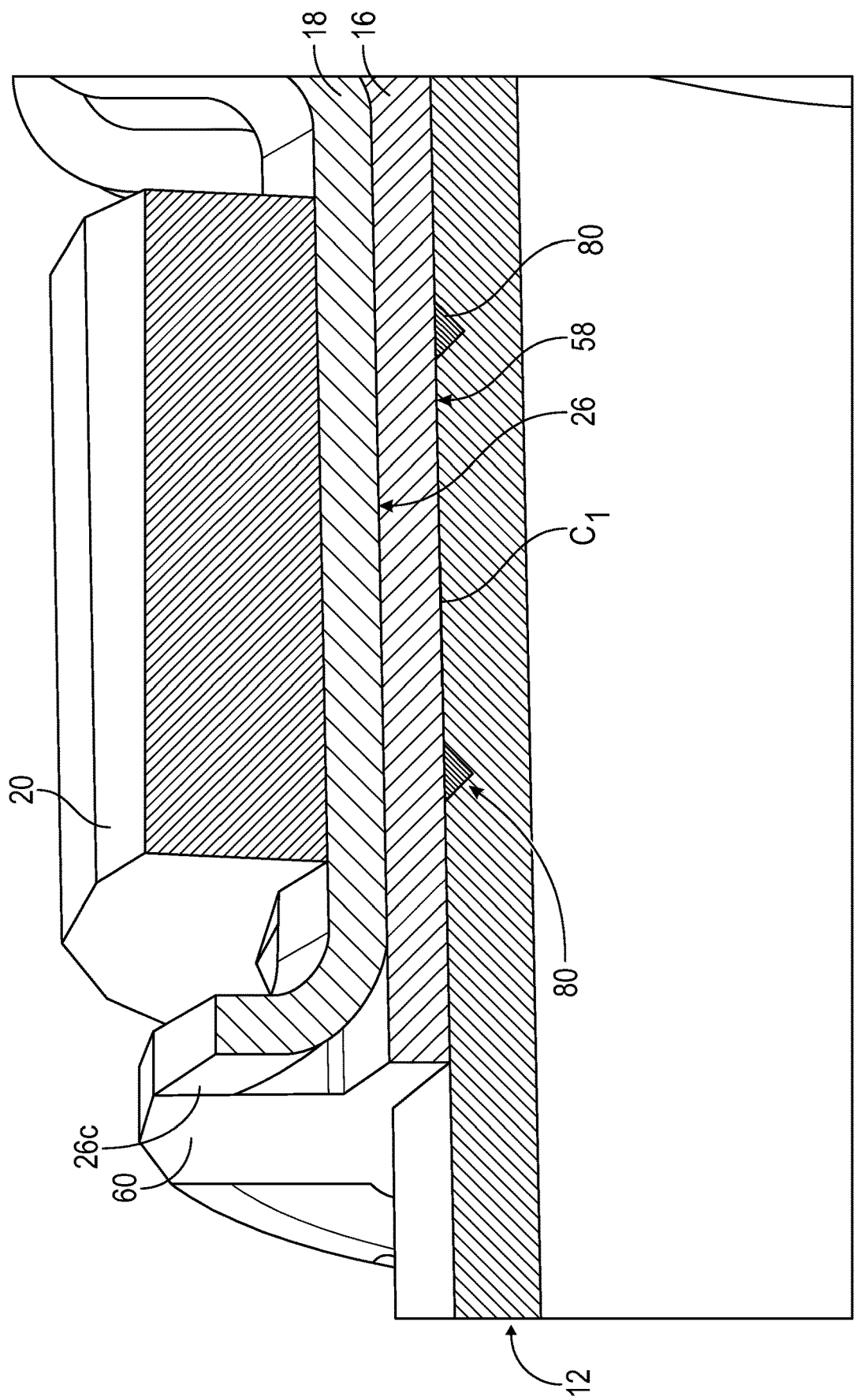

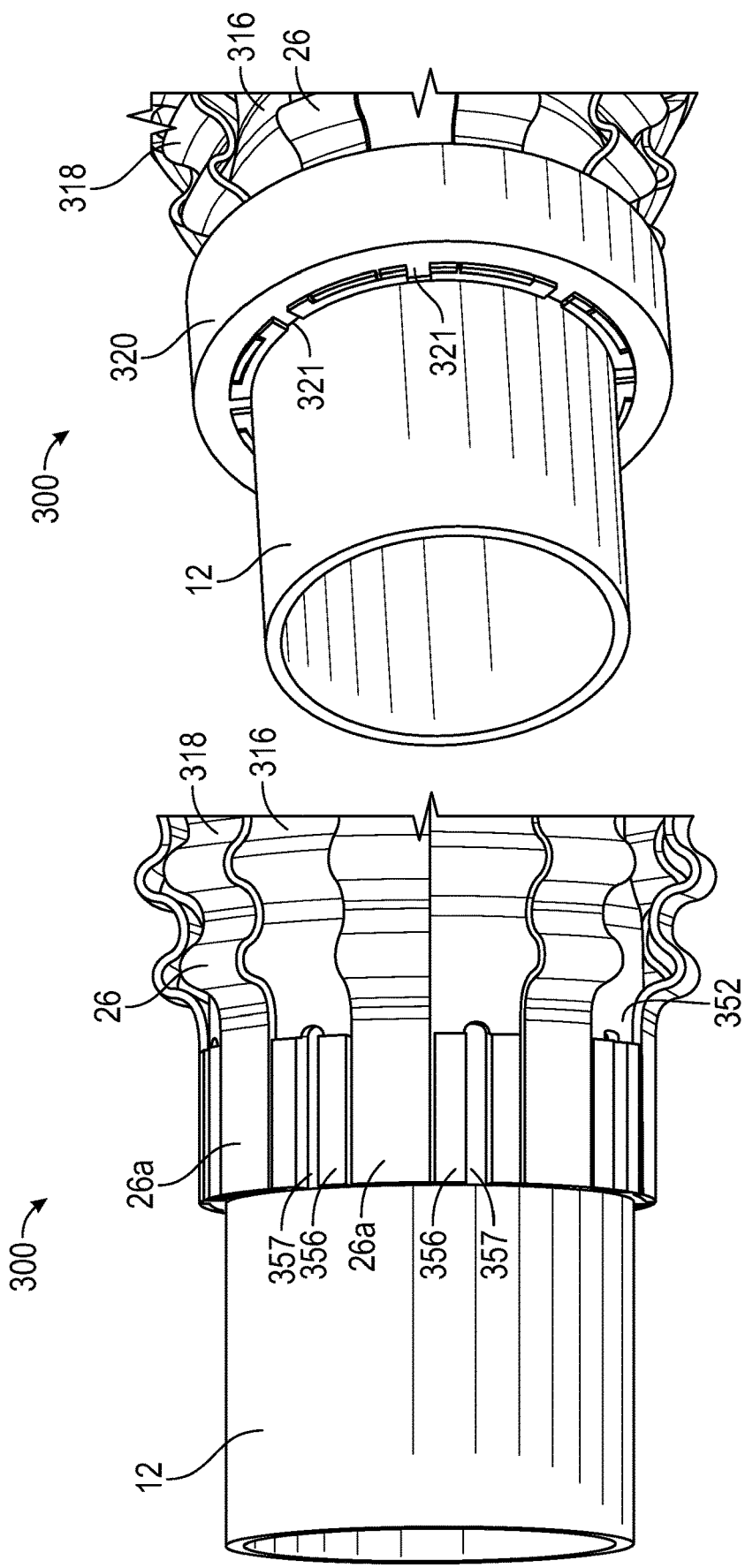

TUBE COUPLING

CROSS-REFERENCE TO RELATED APPLICATIONS

The present application claims priority to Indian Patent Application No. 202111032592, filed Jul. 20, 2021, which is hereby incorporated by reference in its entirety.

TECHNICAL FIELD

The present disclosure relates to tube couplings for coupling two tubes together. More particularly, the present disclosure relates to weld-free tube couplings for coupling two tubes together.

BACKGROUND

Tubes provide fluids to many systems and devices. For example, tubes may provide fluids to engines, to aircraft environments, to cooling systems, etc. In order to provide the orientation, placement, and length of tubes needed in these applications, multiple tubes are often coupled together with tube couplings. The tube couplings provide permanent connections or temporary connections between tubes and also provide fluid tight connections between tubes.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 4 shows a schematic enlarged cross-sectional view of a portion of compressive band for a tube coupling, according to an embodiment of the present disclosure.

FIG. 15 shows a schematic partial perspective view of a tube coupling, according to an embodiment of the present disclosure.

FIG. 16 shows a schematic partial perspective view of the tube coupling of FIG. 15, according to an embodiment of the present disclosure.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The tube couplings of the present disclosure provide a weld-free, permanent coupling between tubes. The tube couplings may include a ball and socket joint that may allow for angular movement, axial movement, or both angular movement and axial movement. The tube couplings may include compressive bands formed of shape memory alloys, which may allow for the couplings to provide a weld-free, permanent connection.

Figure 1:
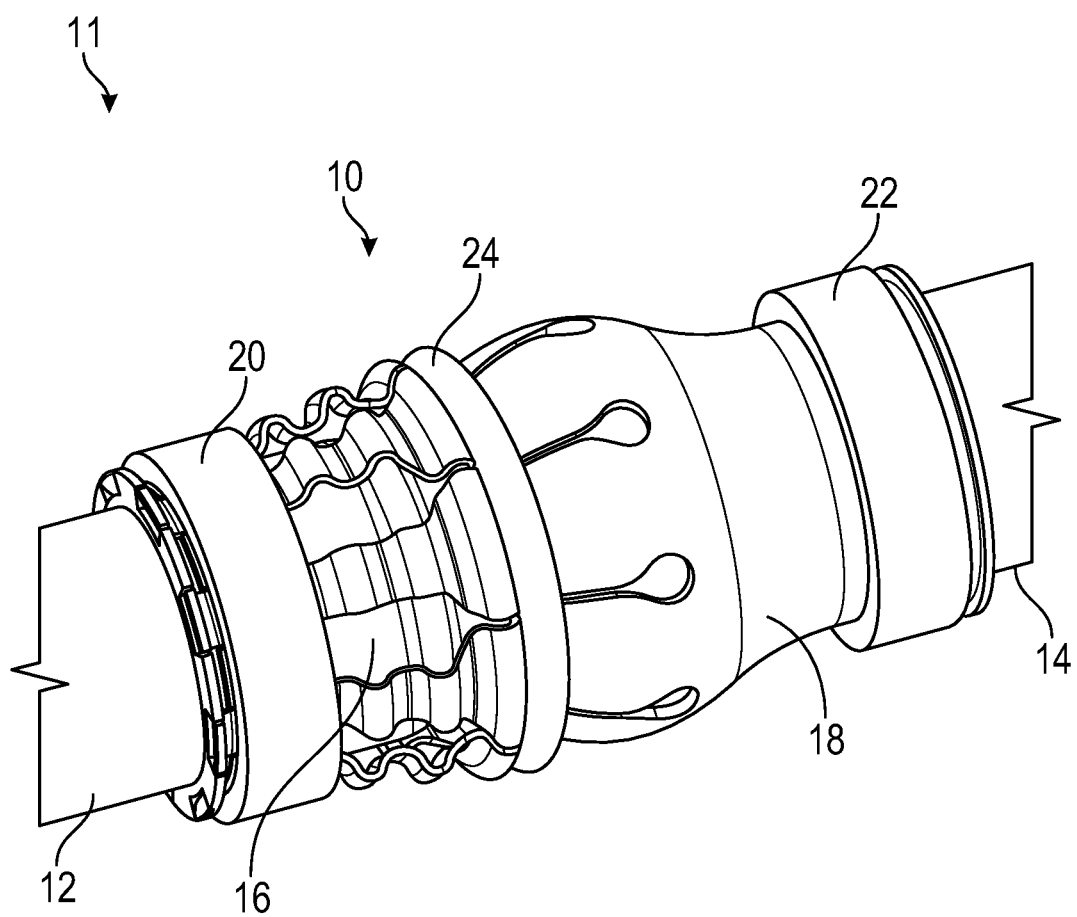
FIG. 1 shows a schematic perspective view of a tube coupling, according to an embodiment of the present disclosure.
Figure 2:
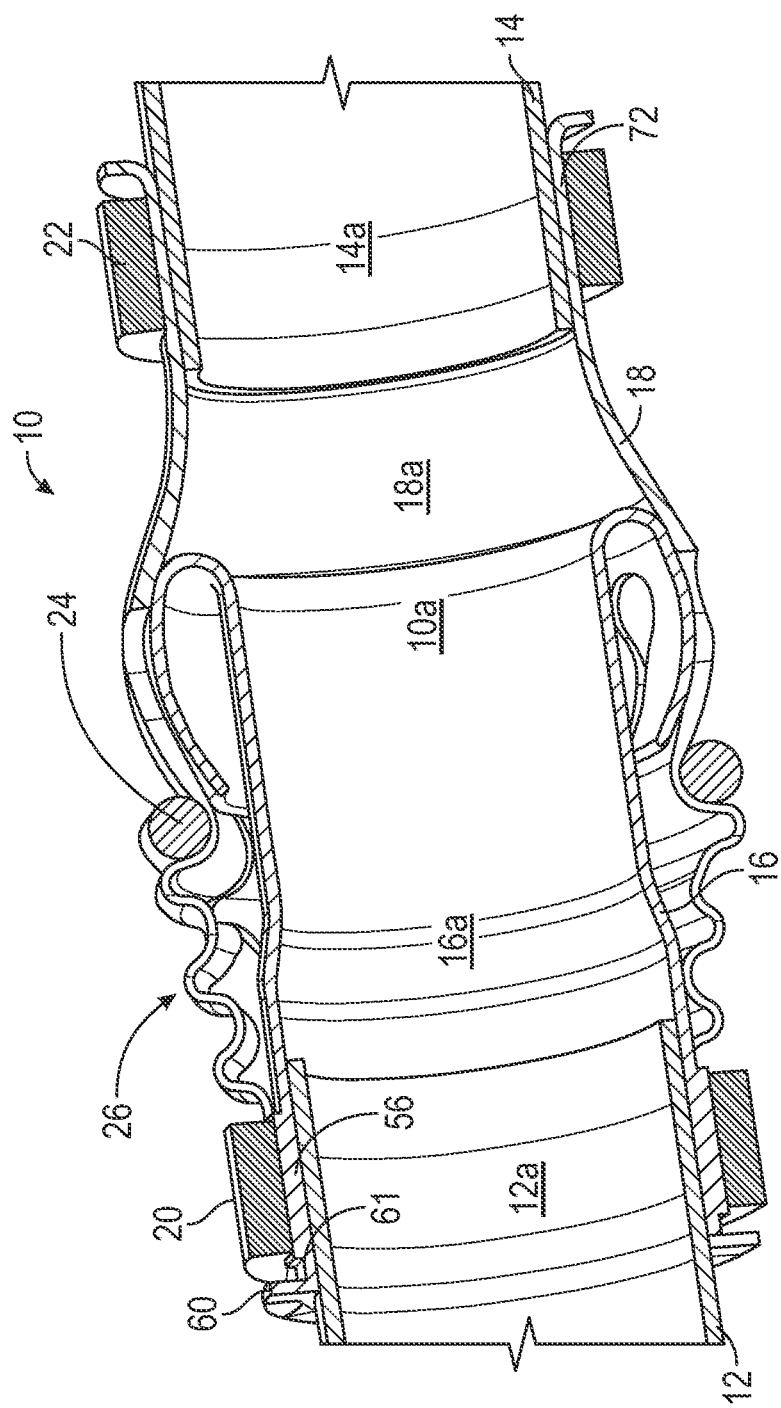
FIG. 2 shows a schematic cross-sectional perspective view of the tube coupling of FIG. 1, taken along a center axis of the tube coupling, according to an embodiment of the present disclosure.
Figure 3:
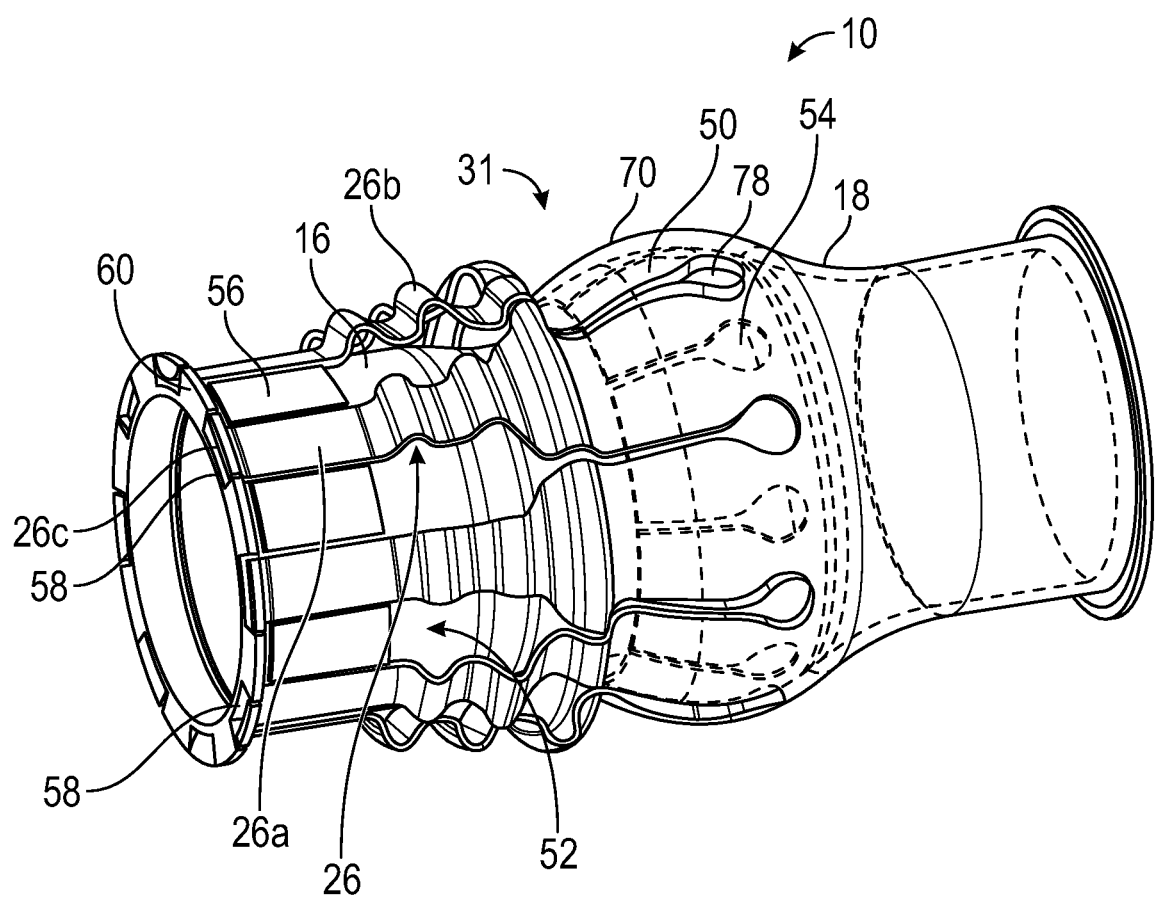
FIG. 3 shows a schematic perspective view of the inner shroud and the outer shroud of the tube coupling of FIG. 1, according to an embodiment of the present disclosure.

FIGS. 1 to 3 show a tube coupling 10. The tube coupling 10 may couple or connect a first tube 12 with a second tube 14 to form a tube assembly 11. The first tube 12 and/or the second tube 14 may be a tube, a pipe, a rod, or the like. The tube coupling 10 may include an inner shroud 16 and an outer shroud 18. The tube coupling 10 may include one or more compressive bands such as, for example, a first band 20 and a second band 22. The first band 20 and the second band 22 may be compressive bands. The first band 20 and the second band 22 may be formed of a shape memory alloy. The tube coupling 10 may include a compressive ring 24. When assembled, the tube coupling 10 may connect the first tube 12 to the second tube 14 without brazes and/or without welds. That is, the tube coupling 10 may be a non-brazed and non-welded tube coupling. The tube coupling 10 may be considered to be weldless.

FIG. 2 shows a schematic cross-sectional perspective view of the tube coupling 10. As shown in FIG. 2, the first tube 12 has an interior or bore 12a and the second tube 14 has an interior or bore 14a. The bore 12a and the bore 14a are coupled together by a bore 10a of the tube coupling 10. The bore 10a is formed by a bore 16a of the inner shroud 16 and a bore 18a of the outer shroud 18. Accordingly, when coupled together with the tube coupling 10, fluid may flow through the first tube 12 and the second tube 14 through the interconnected bore formed by bore 12a, bore 10a (formed of bore 16a and bore 18a), and bore 14a.

With reference to FIG. 2, the compressive ring 24 of the tube coupling 10 may secure the outer shroud 18 to the inner shroud 16. The compressive ring 24 may be located adjacent to one or more spring fingers 26 of the outer shroud 18. Referring briefly to FIG. 3, each of the one or more spring fingers 26 may include a spring finger flat portion 26a, a spring finger spring portion 26b, and a spring finger flange 26c. Referring back to FIG. 2, the outer shroud 18 may be elastically compressed with a compressive force due to the compressive ring 24 on the inner shroud 16. The inner shroud 16 may generate an outward elastic force in reaction to the inward, compressive force. The outward elastic force may be generated as the inner shroud 16 is lightly pressed inside the outer shroud 18. The compressive ring 24 may maintain elastic force on the outer shroud 18.

As shown in FIG. 2, the first band 20 may secure the inner shroud 16 and the outer shroud 18 to the first tube 12. The first band 20 extends around the spring finger flat portion 26a (FIG. 3) of the spring finger 26 of the outer shroud 18 and around an inner shroud longitudinal portion 52 of the inner shroud 16. The second band 22 may secure the outer shroud 18 to the second tube 14. The outer shroud 18 includes an outer shroud longitudinal portion 72. The second band 22 is placed around the outer shroud longitudinal portion 72 for securing the same to the second tube 14. The outer shroud longitudinal portion 72 may be flat, that is, unadorned with surface features. Alternatively, the outer shroud longitudinal portion 72 may be formed in a manner similar to the inner shroud longitudinal portion 52 (FIG. 3).

Referring to FIG. 3, a ball and socket joint 31 is formed between the outer shroud 18 and the inner shroud 16. The inner shroud 16 forms the ball portion 50 and the outer shroud 18 forms the socket portion 70 of the ball and socket joint 31. The ball and socket joint 31 facilitates angulation and torsional rotation between the inner shroud 16 and the outer shroud 18. The compressive force of the compressive ring 24 (FIG. 1) generates an elastic radial force that maintains the outer shroud 18 socket portion 70 always in contact with the inner shroud 16 ball portion 50. The elastic engagement between the ball portion 50 of the inner shroud 16 and the socket portion 70 of the outer shroud 18 maintains the two sliding surfaces of the ball portion 50 and the socket portion 70 in contact over the period of use. This may compensate for looseness and/or material wear caused by use of the tube coupling 10. The spring fingers 26 facilitate axial sliding. This may allow for optimum flexibility and may be obtained by varying the convolutions (e.g., crests and valleys) and thickness of the spring finger spring portion 26b of the spring fingers 26.

The tube coupling 10 allows for axial sliding and axial sliding displacement of the first tube 12 with respect to the second tube 14. The ball portion 50 of the inner shroud 16 may slide within the socket portion 70 of the outer shroud 18. The tube coupling 10 allows for angulation and angular rotation of the first tube 12 with respect to the second tube 14. The ball portion 50 of the inner shroud 16 may rotate within the socket portion 70 of the outer shroud 18.

As shown in FIG. 3, the inner shroud 16 includes the inner shroud longitudinal portion 52. The inner shroud longitudinal portion 52 includes a plurality of inner shroud flats 58 separated from one another with a plurality of inner shroud protrusions 56. The inner shroud longitudinal portion 52 includes a plurality of inner shroud flanges 60. The inner shroud flats 58 and the inner shroud protrusions 56 are continuously formed such that no openings or discontinuities occur in the inner shroud longitudinal portion 52. The inner shroud flanges 60 are separated a distance from the inner shroud protrusions 56, such that a portion 61 (FIG. 2) of the inner shroud flats 58 exists between the inner shroud protrusions 56 and the inner shroud flanges 60.

FIG. 3 shows a schematic perspective view of the ball and socket joint 31. The ball and socket joint 31 includes the inner shroud 16 and the outer shroud 18 coupled together. When assembled, the plurality of inner shroud flats 58 may receive the spring finger flat portions 26a of the spring fingers 26. The inner shroud protrusions 56 may maintain the spring finger flat portions 26a in a particular position to prevent rotation of the spring finger flat portions 26a with respect to the inner shroud 16. The socket portion openings 78 in the socket portion 70 are misaligned with the ball portion openings 54 of the ball portion 50. The misalignment of the socket portion openings 78 and the ball portion openings 54 generates a seal such that there is no leakage out of the ball and socket junction. There may be surface-to-surface contact between the ball portion 50 and the socket portion 70. The ball portion 50 may be elastically compressed due to the compressive force of the socket portion 70 created by the compressive ring 24 (FIG. 1).

FIG. 4 shows a schematic enlarged view of a portion of the tube coupling 10 including the first band 20 and the first tube 12. A similar arrangement, or the same arrangement, may be present with respect to the second band 22 (FIG. 1) and the second tube 14. The first band 20 may be placed around the first tube 12, the inner shroud 16, and the outer shroud 18. The first band 20 may secure the three parts together. Radial teeth 80 are provided on an inner surface of the inner shroud flats 58 of the inner shroud 16. The radial teeth 80 provide a radial teeth seal between the inner shroud 16 and the first tube 12. The first band 20 may be any material or construction to secure the first tube 12, the inner shroud 16, and the outer shroud 18 together. In some examples, the first band 20 may be a shape memory alloy.

Accordingly, with reference to FIGS. 1 to 4, the tube coupling 10 allows for axial, lateral movement of the first tube 12 and the second tube 14 with respect to each other. The spring fingers 26 of the outer shroud 18 may allow for the axial, lateral movement by being capable of compressing and extending. The flexibility of the spring fingers 26, thus, allows for the axial, lateral movement. Furthermore, the tube coupling 10 allows for angular rotation of the first tube 12 and the second tube 14 with respect to each other. The ball and socket joint created by the ball portion 50 (FIG. 3) and the socket portion 70 (FIG. 3) may allow for the angular rotation. That is, the ball portion 50 may be allowed to rotate and/or to move within the socket portion 70. This may accommodate rotation, torsion, and/or angulation between the first tube 12 and the second tube 14.

FIGS. 5 to 17 show exemplary embodiments for coupling the inner shroud 16 (FIG. 1) and/or the outer shroud 18 (FIG. 1) to the first tube 12 (FIG. 1) and/or the second tube 14

(FIG. 1), respectively. In the examples of FIGS. 5 to 17, the inner shroud and the outer shroud may be the same as, or similar to, the inner shroud 16 and the outer shroud 18 as described with respect to FIGS. 1 to 4. For example, the inner shroud and the outer shroud of FIGS. 5 to 17 may form a ball and socket joint such as described with respect to FIGS. 1 to 4. Any of the exemplary embodiments described with respect to FIGS. 1 to 17 for coupling the inner shroud and/or the outer shroud to the first tube and/or the second tube may be combined with any of the other exemplary embodiments described herein.

FIGS. 5 to 9 show an exemplary tube coupling 100. The tube coupling 100 may couple a first tube 12 to a second tube (not shown) via an inner shroud 116 and an outer shroud 18. The coupling between the outer shroud 18 and the second tube may be the same as shown with respect to any exemplary embodiment herein and/or may be the same as shown with respect to the coupling between the inner shroud 116 and first tube 12 as described with respect to FIGS. 5 to 9.

Figure 6:
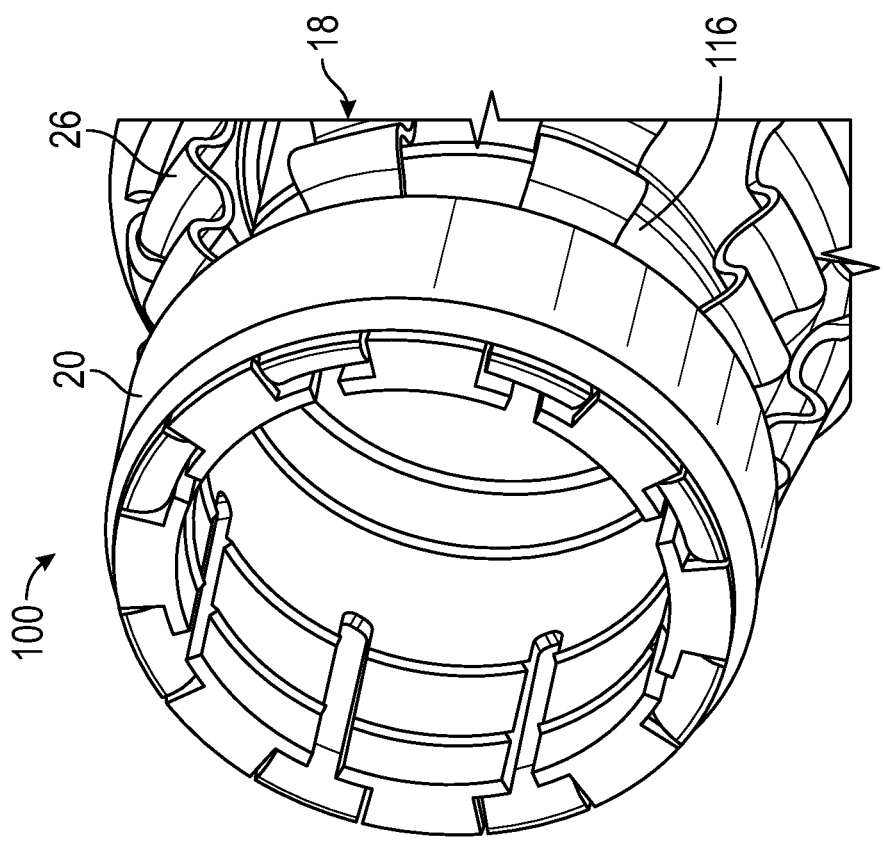
FIG. 6 shows a schematic partial perspective view of the inner shroud and the outer shroud of the tube coupling of FIG. 5, according to an embodiment of the present disclosure.
Figure 5:
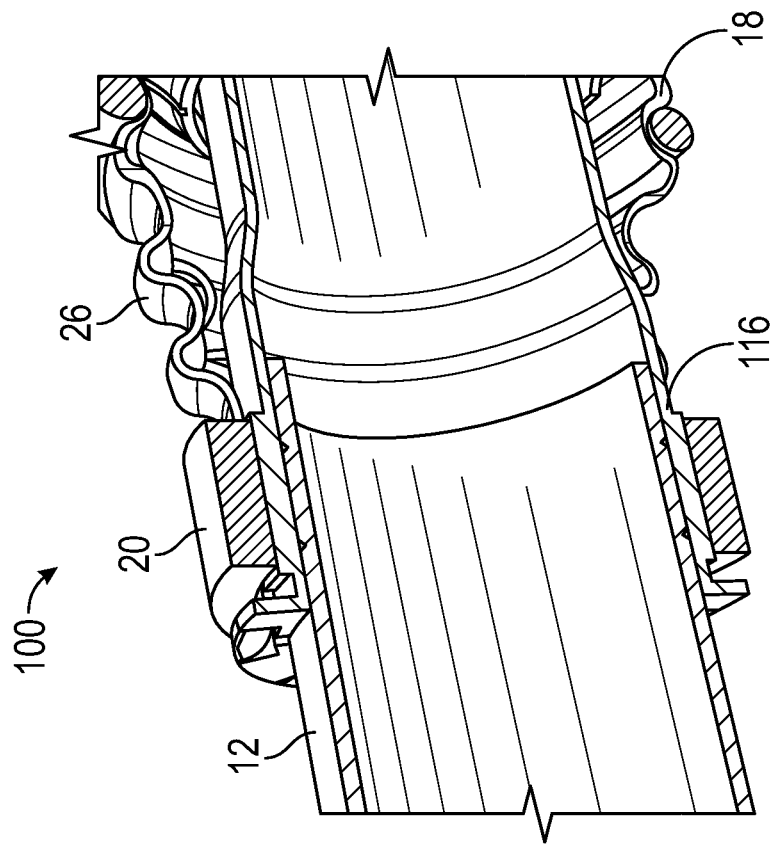
FIG. 5 shows a schematic partial cross-sectional perspective view of a tube coupling, taken along a center axis of the tube coupling, according to an embodiment of the disclosure.

As shown in FIGS. 5 and 6, the first band 20 secures the inner shroud 116 and the outer shroud 18 to the first tube 12 (FIG. 5). The first band 20 extends around the spring finger flat portion 26a (FIG. 9) of the spring finger 26 of the outer shroud 18 and around an inner shroud longitudinal portion 152 (FIG. 7) of the inner shroud 116.

Figure 7:
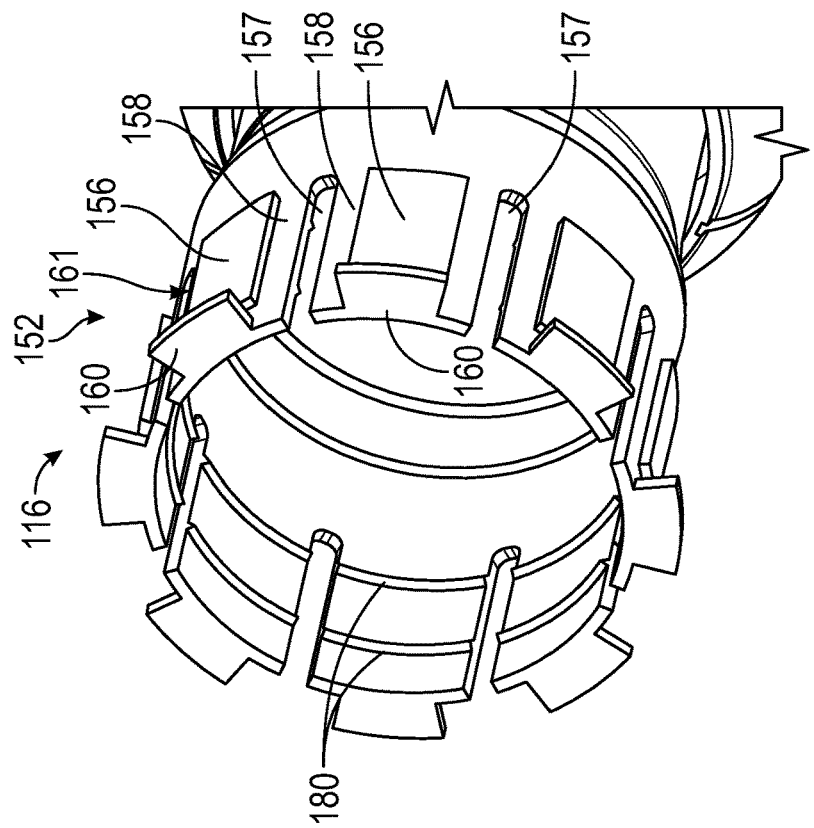
FIG. 7 shows a schematic partial perspective view of the inner shroud of the tube coupling of FIG. 5, according to an embodiment of the present disclosure.

Referring to FIG. 7, an end of the inner shroud 116 is shown. The inner shroud longitudinal portion 152 of the inner shroud 116 includes a plurality of inner shroud flats 158 separated from one another with a plurality of inner shroud slots 157. On each of the plurality of inner shroud flats 158 is an inner shroud protrusion 156. The inner shroud longitudinal portion 152 includes a plurality of inner shroud flanges 160. Each of the inner shroud flanges 160 extends from a respective one of the inner shroud flats 158. The inner shroud flanges 160 are separated a distance from the inner shroud protrusions 156, such that a portion 161 of the inner shroud flats 158 exists between the inner shroud protrusions 156 and the inner shroud flanges 160. The inner shroud 116 includes a plurality of radial teeth 180 extending from an inner surface of the inner shroud flats 158. The radial teeth 180 extend generally in a circular fashion around the inner circumference of the inner shroud longitudinal portion 152, separated by the inner shroud slots 157.

Figure 8:
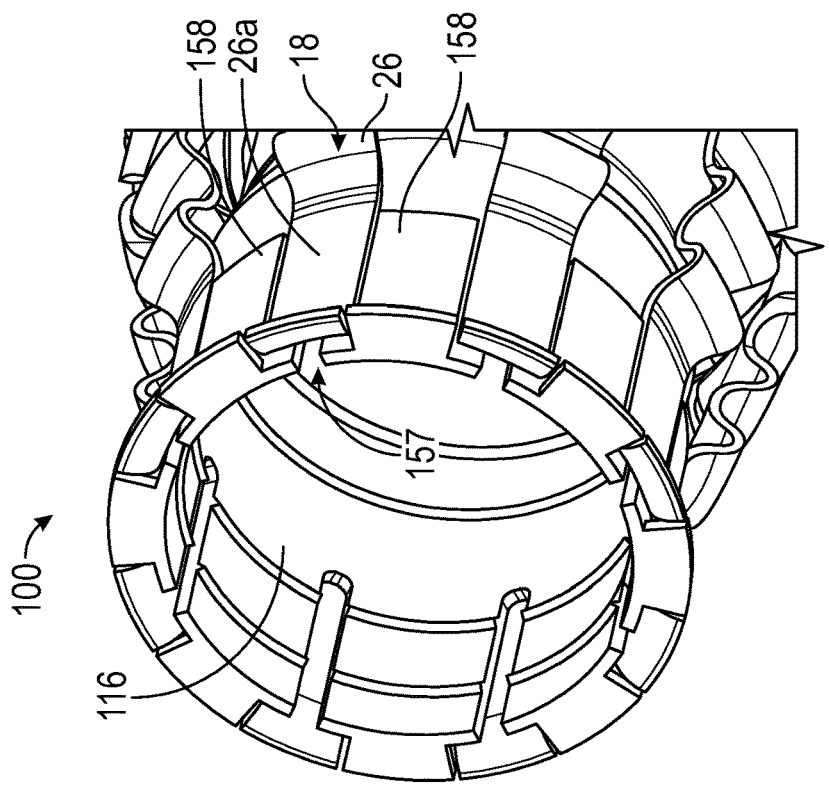
FIG. 8 shows a schematic partial perspective view of the inner shroud and the outer shroud of the tube coupling of FIG. 5, according to an embodiment of the present disclosure.
Figure 9:
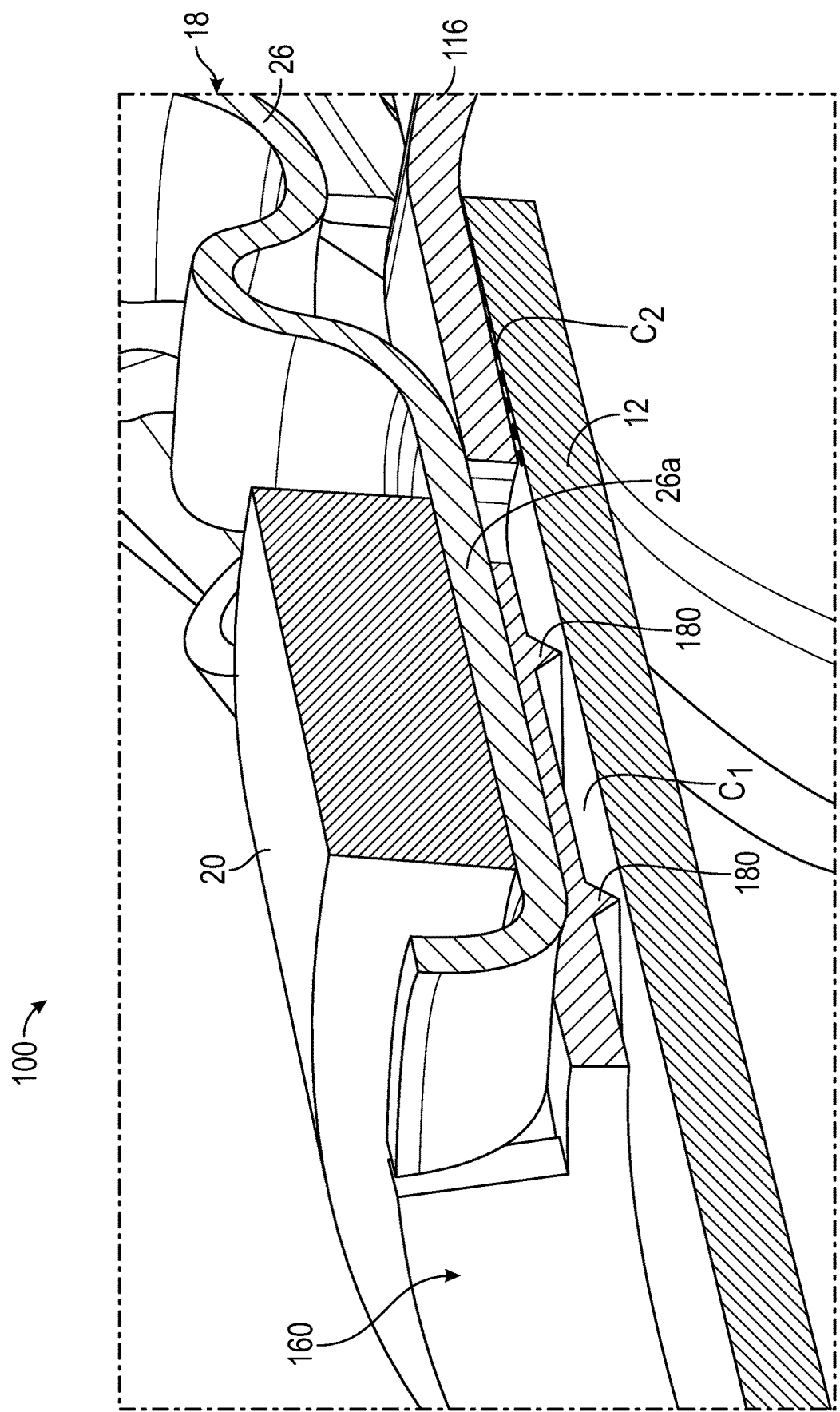
FIG. 9 shows a schematic enlarged cross-sectional perspective view of a portion of compressive band for a tube coupling, according to an embodiment of the present disclosure.

As shown in FIG. 8, the spring finger flat portion 26a of the spring fingers 26 of the outer shroud 18 is located between adjacent inner shroud flats 158. The spring finger flat portion 26a extends over the inner shroud slots 157. Accordingly, as shown in FIG. 9, the first band 20 extends over the spring finger flat portion 26a of the spring fingers 26 of the outer shroud 18 and over the inner shroud protrusions 156 (not visible). The first band 20 may secure the inner shroud 116 and the outer shroud 18 to the first tube 12. The inner shroud flanges 160 may prevent the first band 20 from moving or being displaced past a distal end of the inner shroud 116. The radial teeth 180 of the inner shroud may be swaged into an outer surface of the first tube 12 when the first band 20 is installed to form a secure coupling between the inner shroud 116, outer shroud 18, and first tube 12.

In the exemplary embodiment of FIGS. 5 to 9, the first tube 12 is slid inside or located inside the inner shroud 116. The inner shroud slots 157 may provide flexibility. That is, the inner shroud slots 157 may result in less resistance for the first tube 12 as the first tube 12 slides under the radial teeth 180 on the inner surface of the inner shroud 116. The radial compressive force generated by the shape memory alloy band (e.g., first band 20) swages the underlying body (e.g., the first tube 12) with the radial teeth 180 over the first tube 12. This creates local yielding by swaging the radial teeth 180 on the outer surface of the first tube 12 and may develop a metal-to-metal, permanent, leak proof, weld-free, seal.

FIGS. 10 to 14 show an exemplary tube coupling 200. The tube coupling 200 may couple a first tube 12 to a second tube (not shown) via an inner shroud 216 and an outer shroud 18. The coupling between the outer shroud 18 and the second tube may be the same as shown with respect to any exemplary embodiment herein and/or may be the same as shown with respect to the coupling between the inner shroud 216 and first tube 12 as described with respect to FIGS. 10 to 14.

Figure 11:
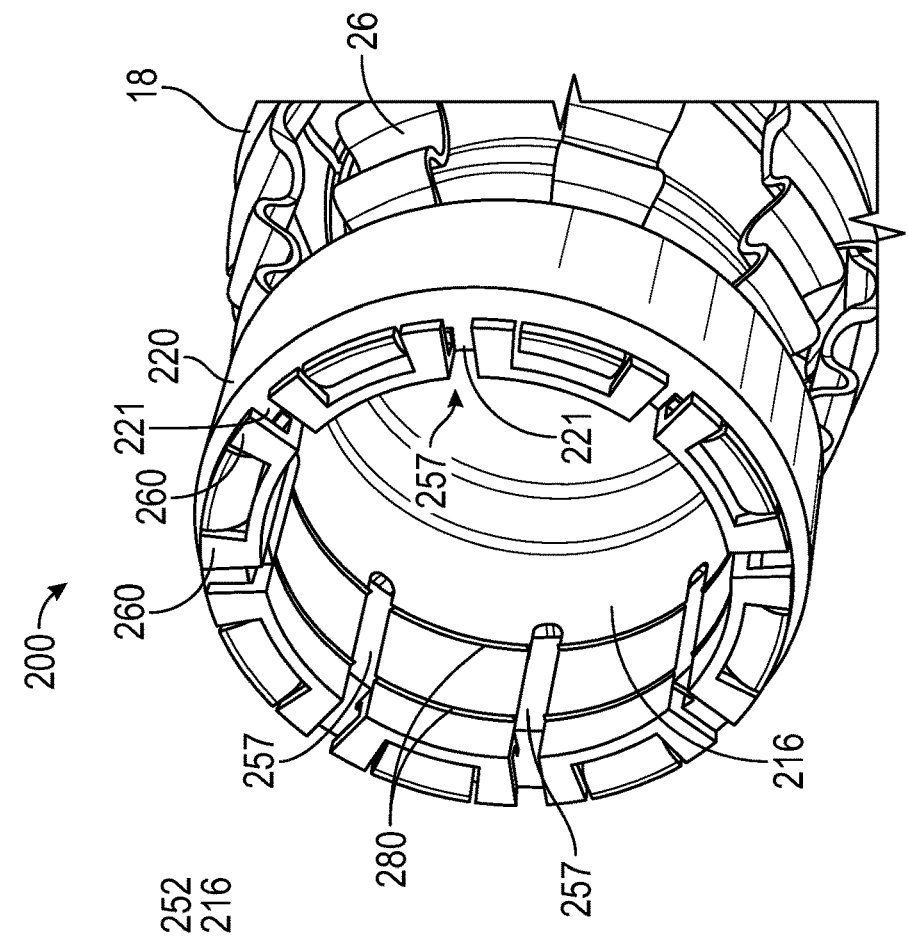
FIG. 11 shows a schematic partial perspective view of the inner shroud and the outer shroud of the tube coupling of FIG. 10, according to an embodiment of the present disclosure.
Figure 10:
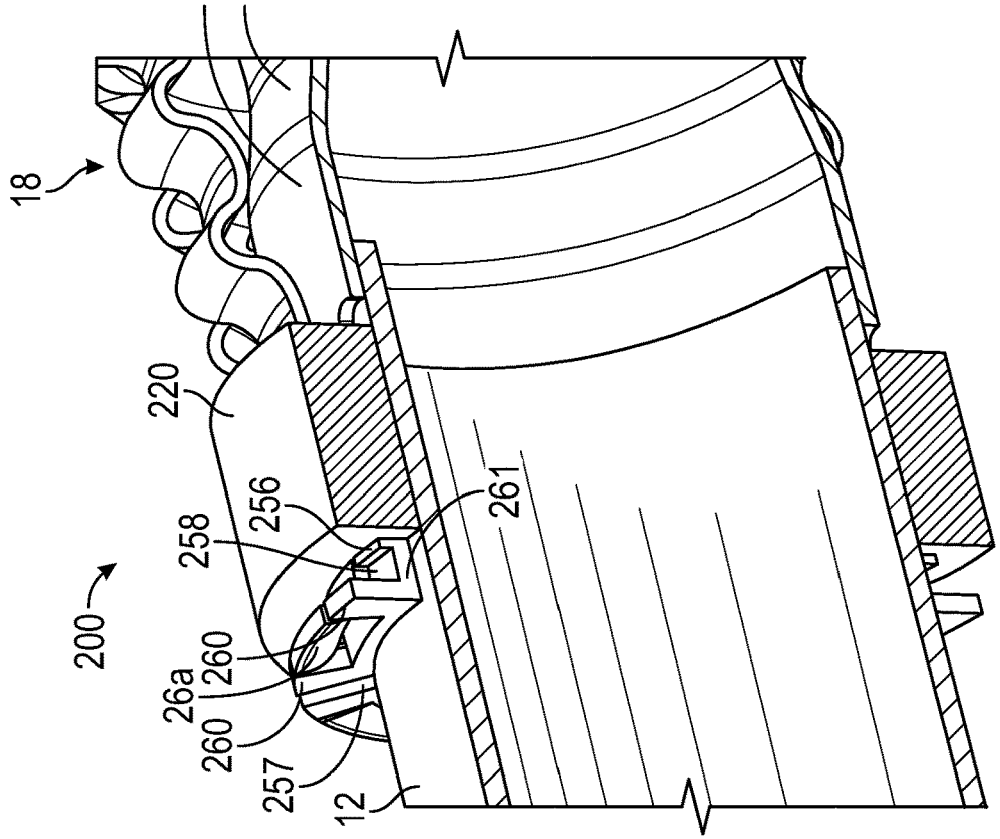
FIG. 10 shows a schematic partial cross-sectional perspective view of a tube coupling, taken along a center axis of the tube coupling, according to an embodiment of the disclosure.

As shown in FIGS. 10 and 11, a first band 220 secures the inner shroud 216 and the outer shroud 18 to the first tube 12 (FIG. 10). The first band 220 extends around the spring finger flat portion 26a (FIG. 13) of the spring finger 26 of the outer shroud 18 and around an inner shroud longitudinal portion 252 of the inner shroud 216. The inner shroud longitudinal portion 252 of the inner shroud 216 includes a plurality of inner shroud flats 258 separated from one another with a plurality of inner shroud slots 257. On each of the plurality of inner shroud flats 258 is an inner shroud protrusion 256. The inner shroud longitudinal portion 252 includes a plurality of inner shroud flanges 260. Each of the inner shroud flanges 260 extends from opposing sides of a respective one of the inner shroud flats 258. The inner shroud flanges 260 are separated a distance from the inner shroud protrusions 256, such that a portion 261 of the inner shroud flats 258 exists between the inner shroud protrusions 256 and the inner shroud flanges 260. The inner shroud 216 includes a plurality of radial teeth 280 extending from an inner surface of the inner shroud flats 258. The radial teeth 280 extends generally in a circular fashion around the inner circumference of the inner shroud longitudinal portion 252, separated by the inner shroud slots 257.

Figure 12:
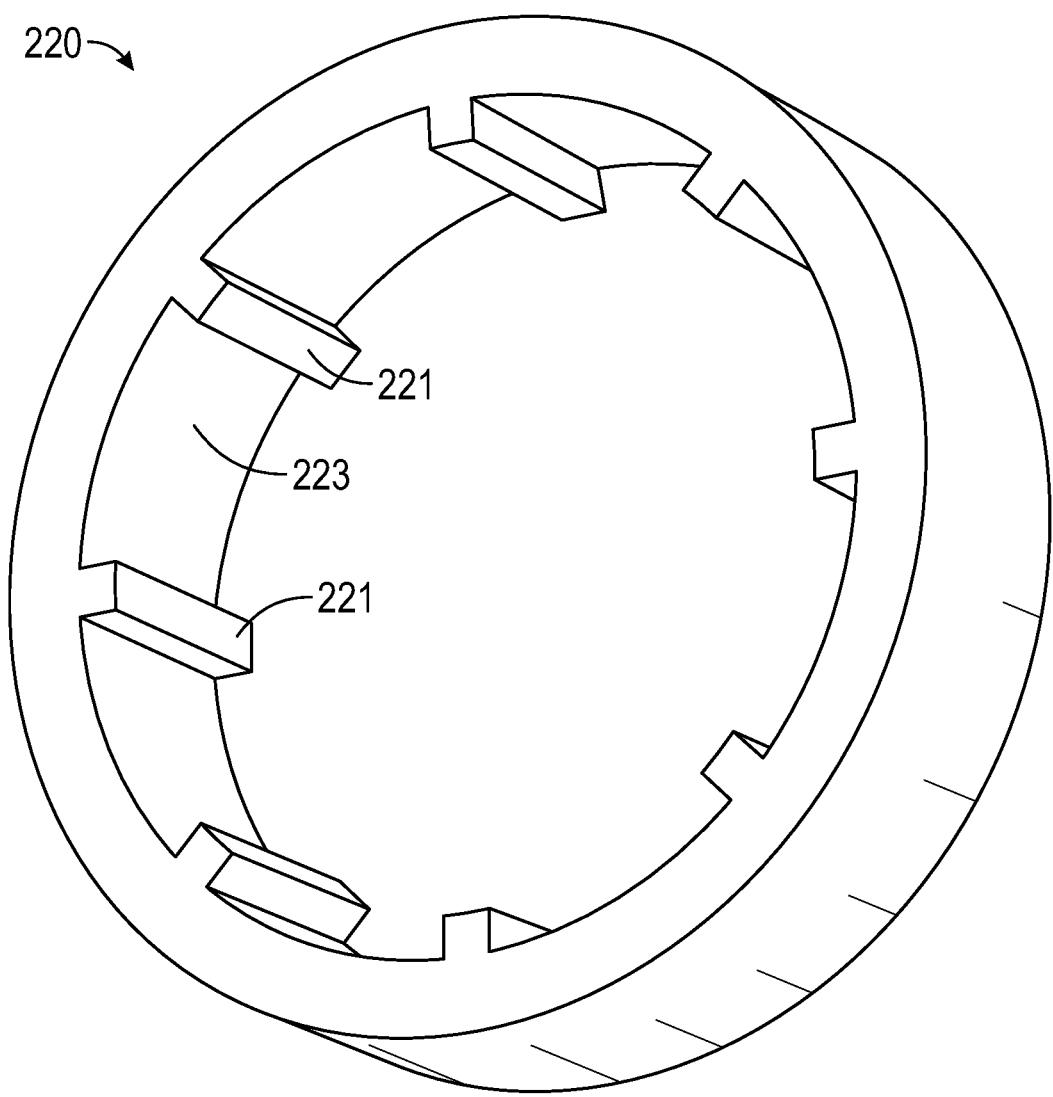
FIG. 12 shows a schematic perspective view of a band of the tube coupling of FIG. 10, according to an embodiment of the present disclosure.
Figure 13:
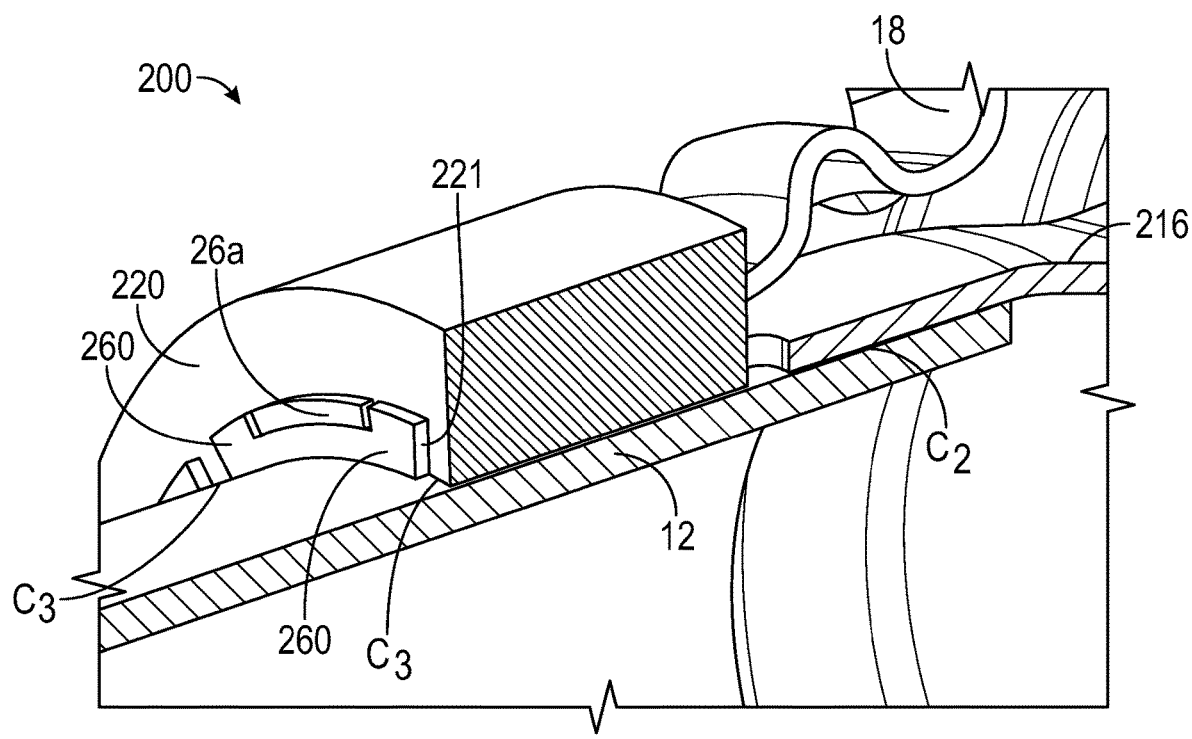
FIG. 13 shows a schematic partial cross-sectional perspective view of the tube coupling of FIG. 10, taken along a center axis of the tube coupling, according to an embodiment of the present disclosure.
Figure 14:
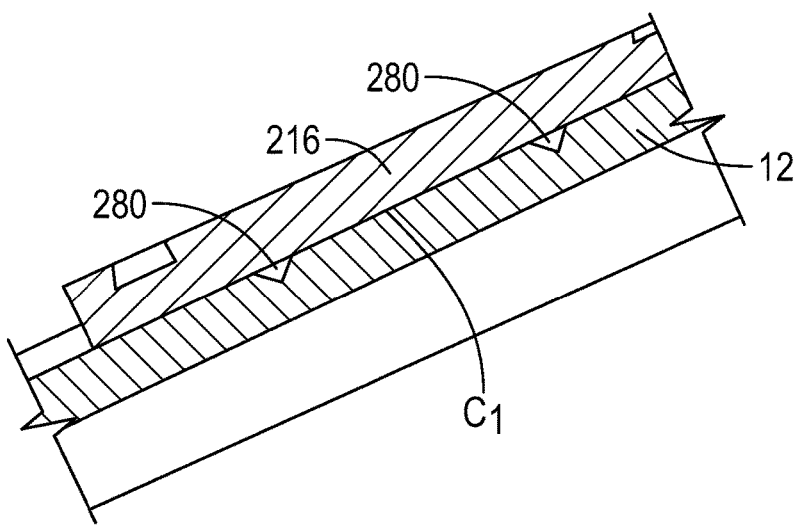
FIG. 14 shows a schematic partial cross-sectional view of the inner shroud and first tube of the tube coupling of FIG. 10, taken along a center axis of the tube coupling, according to an embodiment of the disclosure.

Referring to FIG. 12, the first band 220 includes a plurality of first band protrusions 221 extending radially inward from an inner surface 223 of the first band 220. The plurality of first band protrusions 221 extends circumferentially around the inner surface 223. Although eight first band protrusions 221 are shown, more or fewer may be provided. Referring back to FIG. 11, each of the first band protrusions 221 is located within an inner shroud slot 257 of the inner shroud 216. Thus, the first band 220 extends over the inner shroud 216 and the outer shroud 18 and extends between adjacent inner shroud flats 258 of the inner shroud 216. As shown in FIG. 10, the spring finger flat portion 26a of the spring fingers 26 of the outer shroud 18 are located between adjacent inner shroud flats 258.

Accordingly, as shown in FIG. 11, the first band 220 extends over the spring finger flat portion 26a (shown in FIG. 10, but not visible) of the spring fingers 26 of the outer shroud 18 and over the inner shroud protrusions 256 (not visible). The first band 220 secures the inner shroud 216 and the outer shroud 18 to the first tube 12 (FIG. 10). The inner shroud flanges 260 prevent the first band 220 from moving or being displaced past a distal end of the inner shroud 216. The radial teeth 280 of the inner shroud 216 may be swaged into an outer surface of the first tube 12 when the first band 220 is installed to form a secure coupling between the inner shroud 216, outer shroud 18, and first tube 12.

In the exemplary embodiment of FIGS. 10 to 14, the first tube 12 is slid inside or located inside the inner shroud 216. The inner shroud slots 257 may provide flexibility. That is, the inner shroud slots 257 may result in less resistance for the first tube 12 as the first tube 12 slides under the radial teeth 280 on the inner surface of the inner shroud 216. The first band 220 may be a shape memory alloy band. The first band protrusions 221 of the first band 220 occupy the inner shroud slots 257 and may grip over the first tube 12 outer surface as the first band 220 shrinks (e.g. as the shape memory alloy material is activated). The radial compressive force generated by the shape memory alloy band (e.g., first band 220) swages the underlying body (e.g., first tube 12) with the radial teeth 280 over the first tube 12. This may develop a metal-to-metal, permanent, leak proof, weld-free seal.

Figure 17:
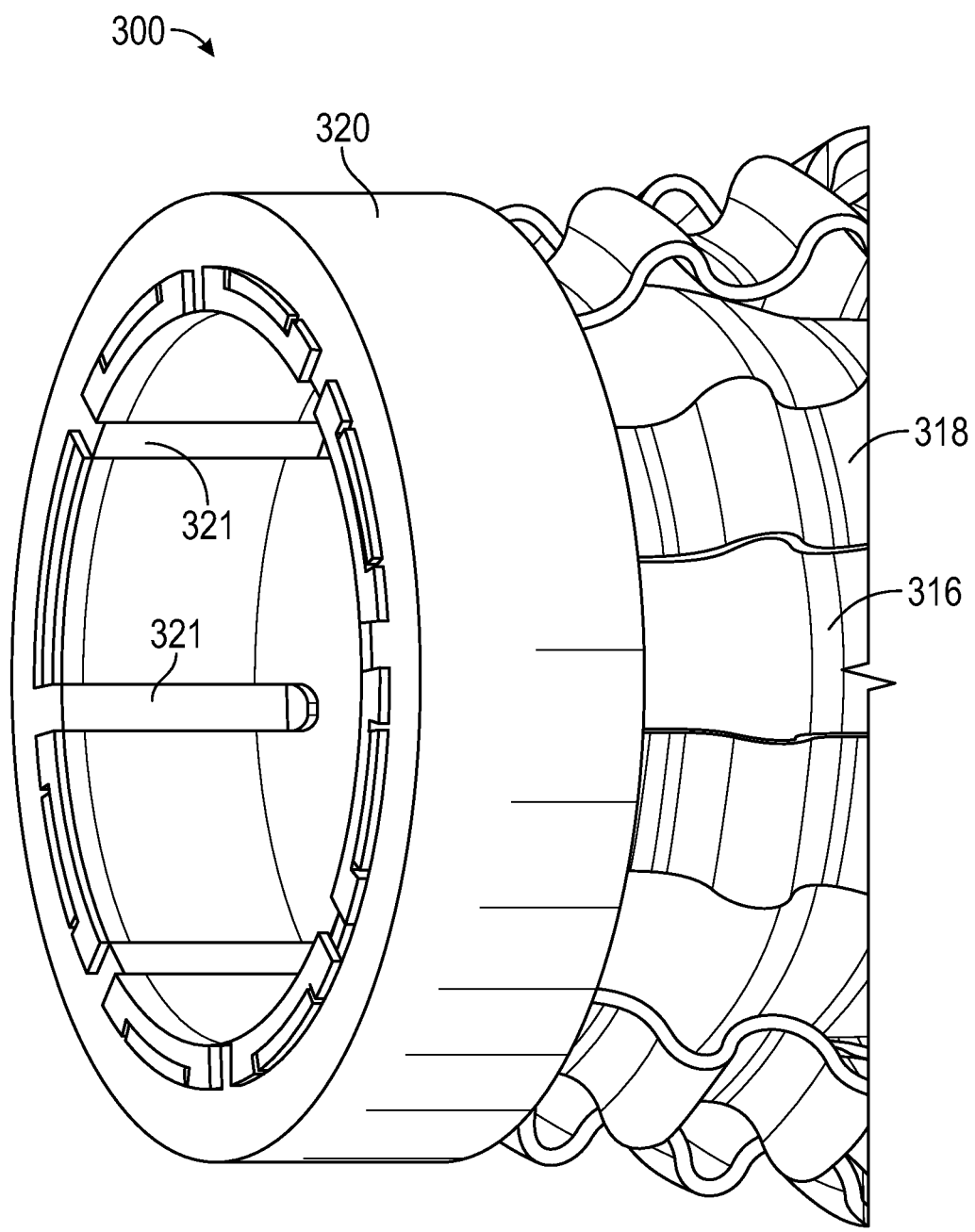
FIG. 17 shows a schematic partial perspective view of the tube coupling of FIG. 15, according to an embodiment of the present disclosure.

FIGS. 15 to 17 show an exemplary tube coupling 300. The tube coupling 300 may couple a first tube 12 to a second tube (not shown) via an inner shroud 316 and an outer shroud 318. The coupling between the outer shroud 318 and the second tube may be the same as shown with respect to any exemplary embodiment herein and/or may be the same as shown with respect to the coupling between the inner shroud 316 and first tube 12 as described with respect to FIGS. 15 to 17.

A first band 320 secures the inner shroud 316 and the outer shroud 318 to the first tube 12 (FIG. 16). The first band 320 may be the same or similar as the first band 220. That is, the first band 320 includes a plurality of first band protrusions 321. The first band 320 extends around the spring finger flat portion 26a (FIG. 15) of the spring finger 26 of the outer shroud 318 and around an inner shroud longitudinal portion 352 of the inner shroud 316. The inner shroud longitudinal portion 352 of the inner shroud 316 includes a plurality of inner shroud flats (not visible) on which the spring finger flat portion 26a is located. The inner shroud flats (not visible) are bounded on either side by inner shroud protrusions 356. The inner shroud longitudinal portion 352 includes a plurality of inner shroud slots 357. Between adjacent inner shroud slots 357 is an inner shroud flat bounded on either side with an inner shroud protrusion 356. Contrary to the prior exemplary embodiments, the inner shroud flanges 60 and/or the spring finger flange 26c may be omitted. Although not shown, the inner shroud 316 may include a plurality of radial teeth, such as the radial teeth 280, extending from an inner surface of the inner shroud flats (not visible).

Each of the first band protrusions 321 is located within in an inner shroud slot 357 of the inner shroud 316. Thus, the first band 320 extends over the inner shroud 316 and the outer shroud 318 and extends between adjacent inner shroud protrusions 356 of the inner shroud 316. As shown in FIG. 15, the spring finger flat portion 26a of the spring fingers 26 of the outer shroud 318 is located between adjacent inner shroud protrusions 356.

Accordingly, as shown in FIG. 16, the first band 320 extends over the spring finger flat portion of the spring fingers 26 of the outer shroud 318 and over the inner shroud protrusions 356. The first band 320 secures the inner shroud 316 and the outer shroud 318 to the first tube 12. The radial teeth of the inner shroud may be swaged into an outer surface of the first tube 12 when the first band 320 is installed to form a secure coupling between the inner shroud 316, outer shroud 318, and first tube 12.

In the exemplary embodiment of FIGS. 15 to 17, the end features of the inner shroud 316 and the outer shroud 318 are straight ends, e.g., as opposed to flanged ends such as described with respect to FIGS. 1 to 14. This may reduce the sizing requirement of the shape memory alloy band (e.g., first band 320) and may be easier to slide over the seating region of the inner shroud 316 and the outer shroud 318 as the first band 320 swages the underlying tube surface.

Referring to FIGS. 1 to 17, one or more contact surfaces are provided between any combination of the first band, the inner shroud, and the outer shroud. The one or more contact surfaces may ensure a leak proof connection between the inner shroud, the outer shroud, and the first tube. Similar contact surfaces may be present between the outer shroud and the second tube to ensure a leak proof connection between the outer shroud and the second tube.

In the example of FIGS. 1 to 4, a first contact surface $C_1$ (FIG. 4) is present between an inner surface of the inner shroud 16 and an outer surface of the first tube 12 at the radial teeth 80. The circumferential running radial teeth 80 on the inner shroud 16 locally yield the outer surface of the first tube 12 and may develop a permanent metal-to-metal seal along the first contact surface $C_1$.

In the example of FIGS. 5 to 9, a first contact surface $C_1$ (FIG. 9) is present between an inner surface of the inner shroud 116 and an outer surface of the first tube 12 at the radial teeth 180. The circumferential running radial teeth 180 on the inner shroud 116 (except where not present at the inner shroud slots 157) locally yield the outer surface of the first tube 12 and may develop a permanent metal-to-metal seal along the first contact surface $C_1$. A second contact surface $C_2$ (FIG. 9) is present between the inner surface of the inner shroud 116 and the outer surface of the first tube 12. The radial compressive force generated by shape memory alloy band (e.g., the first band 20) may ensure surface contact at the overlapping region of the inner shroud 116 (e.g., longitudinally outside of and displaced from the cut-out region of shroud, that is, the region of the shroud having inner shroud slots 157) and the first tube 12.

In the example of FIGS. 10 to 14, a first contact surface $C_1$ (FIG. 14) is present between an inner surface of the inner shroud 216 and an outer surface of the first tube 12 at the radial teeth 280. The circumferential running radial teeth 280 on the inner shroud 216 (except where not present at the inner shroud slots 257) locally yield the outer surface of the first tube 12 and may develop a permanent metal-to-metal seal along the first contact surface $C_1$. A second contact surface $C_2$ (FIG. 13) is present between the inner surface of the inner shroud 216 and the outer surface of the first tube 12. The radial compressive force generated by shape memory alloy band (e.g., the first band 220) may ensure surface contact at the overlapping region of the inner shroud 216 (e.g., longitudinally outside of and displaced from the cut-out region of shroud, that is, the region of the shroud having inner shroud slots 257) and the first tube 12. A third contact surface $C_3$ is present between the first band protrusions 221 and the first tube 12. The third contact surface $C_3$ is present where the shape memory alloy band (e.g. first band 220) has protrusions (e.g., first band protrusions 221) that occupy the cutout region (e.g., inner shroud slots 257) of the inner shroud 216 and may grip over the outer surface of the first tube 212 as the first band 220 shrinks (e.g., compresses). The example of FIGS. 15 to 17 may have the same three contact surfaces described with respect to FIGS. 10 to 14.

The tube couplings of the present disclosure may be non-welded and/or non-brazed connections. The tube couplings of the present disclosure may allow for retrofitting in an application. The tube couplings of the present disclosure may be serviceable and/or replaceable in the manufacturing plant or in the field.

The tube couplings shown in the elements of the present disclose may allow for flexible coupling of two fluid carrying conduits (e.g., the first tube and the second tube as described herein). The tube couplings of the present disclosure may allow for articulation between the two conduits. The tube couplings of the present disclosure may although for thermal expansion experienced during use of the tubes and tube couplings and may allow for dynamically decoupling of the components. The tube couplings of the present disclosure may allow for high temperature applications and may be capable of handling thermal growth (e.g., thermal expansion).

The tube couplings of the present disclosure may provide a coupling without brazes and/or without welds. That is, the tube couplings of the present disclosure may be a non-brazed and non-welded tube coupling. The tube couplings of the present disclosure may be considered to be weldless. The tube couplings of the present disclosure may be flexible joint assemblies and may be weld-free joint assemblies.

The tube couplings of the present disclosure may provide a non-welded and non-threaded permanent tube joint using shape memory alloy bands or rings. The bands and rings of the present disclosure may be compressive bands and compressive rings. The bands and rings of the present disclosure may be shape memory alloy material. The tube couplings of the present disclosure may eliminate inspection procedures required on welded joints, may address failures due to stress concentration related to weld quality, may reduce repair downtime as compared to welded connections, may eliminate a hot working process, may be environmentally friendly, and/or may allow for leaner manufacturing by eliminating and/or reducing weld related activities.

The tube couplings of the present disclosure may include little or no features extending into the passageway or bores of the tubes being coupled. That is, the flow through the tubes and the tube coupling may not be obstructed or may be minimally obstructed by features of the tube coupling. This may result in low pressure loss or no pressure loss of the flow through the tube coupling from the first tube to the second tube.

The tube couplings of the present disclosure may include a wear resistant layer on the wear surfaces of the coupling. The wear resistance layer may be achieved with flame spraying or other coating methods. For example, the surfaces of the ball portion and the socket portion, which are in constant contact, may be coated with a wear coating and/or may be formed of a wear resistant material. The wear resistant layer may be a dry film lubricant, polytetrafluoroethylene (PTFE), graphite, molybdenum disulfide, etc.

The shape memory alloy of the present disclosure may be nickel titanium, also known as Nitinol, although other shape memory alloys are contemplated. The shape memory alloy may allow for the tube couplings of the present disclosure to be permanent joints without the need for welding, brazing, or the like. Thus, the shape memory alloy may allow for weldless or weld-free tube couplings.

The tube couplings of the present disclosure that include a ball and socket joint, and may include a spring finger device capable of managing thermal expansion, angulation, torsion, and vibration of the tubes and tube coupling. The inner shroud and the outer shroud of the present disclosure may be produced through electroforming. The thickness of the inner shroud and the thickness of the outer shroud may be varied or selected to allow for a desired or required flexibility of the tube coupling. The spring fingers of the outer shroud may have variable thickness or constant thickness.

The inner shroud and/or the outer shroud of the present disclosure may be formed of nickel, steel, INCONEL®, high-strength nickel alloys, high-temperature tolerant materials, or combinations thereof. The inner shroud may be a nitrogen strengthened stainless steel (e.g., an austenitic stainless steel Nitronic alloy) and/or other wear resistant material. The inner shroud and the outer shroud may be formed with electroforming, additive manufacturing, or other manufacturing methods (e.g., sheet metal forming, hydroforming, electroforming, mechanical dye form press, blow forming, electrical discharge machining (EDM) with laser finishing, etc.)

The tube couplings of the present disclosure may be provided in gas turbine engines, other engines, and other aspects of the aircraft industry. The tube couplings may be provided in external pipes sitting on an engine casing. For example, the tube couplings may be used in an environmental control system, a fourth stage manifold, a seventh stage manifold, a cooling manifold, a starter duct, an anti-ice duct, air conduits, and/or a bleed duct. The tube couplings of the present disclosure may be provided in any indication where coupling of two tubes is needed. The tube couplings of the present disclosure may allow for a flexible joint between an airframe and engine ducts.

Further aspects of the present disclosure are provided by the subject matter of the following clauses.

A tube coupling for coupling a first tube and a second tube includes an inner shroud located circumferentially around a first tube distal end at an inner shroud distal end, the inner shroud distal end having one or more radial teeth, an outer shroud having a first outer shroud distal end and a second outer shroud distal end, the first outer shroud distal end located circumferentially around a second tube distal end and the second outer shroud distal end located circumferentially around the inner shroud distal end, and a band configured to elastically compress the first outer shroud distal end onto the inner shroud distal end, the band formed of a shape memory alloy, wherein the band elastically compresses the first outer shroud distal end and the inner shroud distal end such that the one or more radial teeth are swaged into an outer surface of the first tube.

A tube coupling according to any preceding clause, wherein the one or more radial teeth extend radially inwardly from an inner surface of the inner shroud.

A tube coupling according to any preceding clause, wherein the one or more radial teeth extend circumferentially around the inner surface of the inner shroud.

A tube coupling according to any preceding clause, the outer shroud comprising a plurality of spring fingers, the plurality of spring fingers configured to allow relative axial movement between the inner shroud and the outer shroud.

A tube coupling according to any preceding clause, wherein each spring finger of the plurality of spring fingers comprise a flat portion and a spring portion, the spring portion being formed of convolutions of crests and valleys.

A tube coupling according to any preceding clause, the inner shroud comprising a longitudinal portion and a plurality of inner shroud protrusions on the longitudinal portion, wherein the plurality of inner shroud protrusions are configured to separate adjacent spring fingers of the plurality of spring fingers.

A tube coupling according to any preceding clause, the inner shroud further comprising a plurality of inner shroud slots, each spring finger of the plurality of spring fingers aligned with a respective inner shroud slot.

A tube coupling according to any preceding clause, the inner shroud further comprising a plurality of inner shroud flats and a plurality of inner shroud slots, wherein adjacent inner shroud flats of the plurality of inner shroud flats are separated from each other by one of the inner shroud slots of the plurality of inner shroud slots.

A tube coupling according to any preceding clause, wherein each spring finger of the plurality of spring fingers is aligned with an inner shroud flat of the plurality of inner shroud flats.

A tube coupling according to any preceding clause, wherein the band extends over the plurality of inner shroud protrusions and the plurality of spring fingers.

A tube coupling according to any preceding clause, wherein each of the plurality of spring fingers comprises a spring finger flange and each of the plurality of inner shroud flats comprises an inner shroud flange.

A tube coupling according to any preceding clause, the inner shroud further comprising a plurality of inner shroud protrusions and a plurality of inner shroud slots, wherein adjacent inner shroud protrusions of the plurality of inner shroud protrusions are separated from each other by one of the inner shroud slots of the plurality of inner shroud slots.

A tube coupling according to any preceding clause, wherein the band comprises a plurality of band protrusions, each of the band protrusions of the plurality of band protrusions being located within a respective inner shroud slot.

A tube assembly includes a first tube, a second tube, and a tube coupling for coupling the first tube and the second tube, the tube coupling includes an inner shroud located circumferentially around a first tube distal end at an inner shroud distal end, the inner shroud distal end having one or more radial teeth, an outer shroud having a first outer shroud distal end and a second outer shroud distal end, the first outer shroud distal end located circumferentially around a second tube distal end and the second outer shroud distal end located circumferentially around the inner shroud distal end, and a band configured to elastically compress the first outer shroud distal end onto the inner shroud distal end, the band formed of a shape memory alloy, wherein the band elastically compresses the first outer shroud distal end and the inner shroud distal end such that the one or more radial teeth are swaged into an outer surface of the first tube.

A tube assembly according to any preceding claim, wherein the one or more radial teeth extend radially inwardly from an inner surface of the inner shroud.

A tube assembly according to any preceding claim, wherein the one or more radial teeth extend circumferentially around the inner surface of the inner shroud.

A tube assembly according to any preceding claim, the outer shroud comprising a plurality of spring fingers, the plurality of spring fingers configured to allow relative axial movement between the inner shroud and the outer shroud.

A tube assembly according to any preceding claim, wherein each spring finger of the plurality of spring fingers comprise a flat portion and a spring portion, the spring portion being formed of convolutions of crests and valleys.

A tube assembly according to any preceding claim, the inner shroud comprising a longitudinal portion and a plurality of inner shroud protrusions on the longitudinal portion, wherein the plurality of inner shroud protrusions are configured to separate adjacent spring fingers of the plurality of spring fingers.

A tube assembly according to any preceding claim, the inner shroud further comprising a plurality of inner shroud slots, each spring finger of the plurality of spring fingers aligned with a respective inner shroud slot.

A tube assembly according to any preceding claim, the inner shroud further comprising a plurality of inner shroud flats and a plurality of inner shroud slots, wherein adjacent inner shroud flats of the plurality of inner shroud flats are separated from each other by one of the inner shroud flats of the plurality of inner shroud slots.

A tube assembly according to any preceding claim, wherein each spring finger of the plurality of spring fingers is aligned with an inner shroud flat of the plurality of inner shroud flats.

A tube assembly according to any preceding claim, wherein the band extends over the plurality of inner shroud protrusions and the plurality of spring fingers.

A tube assembly according to any preceding claim, wherein each of the plurality of spring fingers comprises a spring finger flange and each of the plurality of inner shroud flats comprises an inner shroud flange.

A tube assembly according to any preceding claim, the inner shroud further comprising a plurality of inner shroud protrusions and the plurality of inner shroud slots, wherein adjacent inner shroud protrusions of the plurality of inner shroud protrusions are separated from each other by one of the inner shroud slots of the plurality of inner shroud flats.

A tube assembly according to any preceding claim, wherein the band comprises a plurality of band protrusions, each of the band protrusions of the plurality of band protrusions located within a respective inner shroud slot.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A tube coupling for coupling a first tube and a second tube, the tube coupling comprising:
   (a) an inner shroud located circumferentially around a first tube distal end at an inner shroud distal end, the inner shroud distal end having one or more radial teeth;
   (b) an outer shroud having a first outer shroud distal end and a second outer shroud distal end, the first outer shroud distal end located circumferentially around a second tube distal end and the second outer shroud distal end located circumferentially around the inner shroud distal end; and
   (c) a band configured to elastically compress the second outer shroud distal end onto the inner shroud distal end, the band formed of a shape memory alloy,
   wherein the band elastically compresses the second outer shroud distal end and the inner shroud distal end such that the one or more radial teeth are swaged into an outer surface of the first tube.

2. The tube coupling of claim 1, wherein the one or more radial teeth extend radially inwardly from an inner surface of the inner shroud and circumferentially around the inner surface of the inner shroud.

3. The tube coupling of claim 1, the outer shroud comprising a plurality of spring fingers, the plurality of spring fingers configured to allow relative axial movement between the inner shroud and the outer shroud.

4. The tube coupling of claim 3, wherein each spring finger of the plurality of spring fingers comprise a flat portion and a spring portion, the spring portion being formed of convolutions of crests and valleys.

5. The tube coupling of claim 3, the inner shroud comprising a longitudinal portion and a plurality of inner shroud protrusions on the longitudinal portion, wherein the plurality of inner shroud protrusions are configured to separate adjacent spring fingers of the plurality of spring fingers.

6. The tube coupling of claim 5, the inner shroud further comprising a plurality of inner shroud slots, each spring finger of the plurality of spring fingers aligned with a respective inner shroud slot.

7. The tube coupling of claim 5, the inner shroud further comprising a plurality of inner shroud flats and a plurality of inner shroud slots, wherein adjacent inner shroud flats of the plurality of inner shroud flats are separated from each other by one of the inner shroud slots of the plurality of inner shroud slots, and wherein each spring finger of the plurality of spring fingers is aligned with an inner shroud flat of the plurality of inner shroud flats.

8. The tube coupling of claim 7, wherein the band extends over the plurality of inner shroud protrusions and the plurality of spring fingers.

9. The tube coupling of claim 7, wherein each of the plurality of spring fingers comprises a spring finger flange and each of the plurality of inner shroud flats comprises an inner shroud flange.

10. The tube coupling of claim 5, the inner shroud further comprising a plurality of inner shroud slots, wherein adjacent inner shroud protrusions of the plurality of inner shroud protrusions are separated from each other by one of the inner shroud slots of the plurality of inner shroud slots, and wherein the band comprises a plurality of band protrusions, each of the band protrusions of the plurality of band protrusions being located within a respective inner shroud slot.

11. A tube assembly comprising:
a first tube;
a second tube; and
a tube coupling for coupling the first tube and the second tube, the tube coupling comprising:
(a) an inner shroud located circumferentially around a first tube distal end at an inner shroud distal end, the inner shroud distal end having one or more radial teeth;
(b) an outer shroud having a first outer shroud distal end and a second outer shroud distal end, the first outer shroud distal end located circumferentially around a second tube distal end and the second outer shroud distal end located circumferentially around the inner shroud distal end; and
(c) a band configured to elastically compress the second outer shroud distal end onto the inner shroud distal end, the band formed of a shape memory alloy, wherein the band elastically compresses the second outer shroud distal end and the inner shroud distal end such that the one or more radial teeth are swaged into an outer surface of the first tub e.

12. The tube assembly of claim 11, wherein the one or more radial teeth extend radially inwardly from an inner surface of the inner shroud and circumferentially around the inner surface of the inner shroud.

13. The tube assembly of claim 11, the outer shroud comprising a plurality of spring fingers, the plurality of spring fingers configured to allow relative axial movement between the inner shroud and the outer shroud.

14. The tube coupling of claim 13, wherein each spring finger of the plurality of spring fingers comprise a flat portion and a spring portion, the spring portion being formed of convolutions of crests and valleys.

15. The tube assembly of claim 13, the inner shroud comprising a longitudinal portion and a plurality of inner shroud protrusions on the longitudinal portion, wherein the plurality of inner shroud protrusions are configured to separate adjacent spring fingers of the plurality of spring fingers.

16. The tube assembly of claim 15, the inner shroud further comprising a plurality of inner shroud slots, each spring finger of the plurality of spring fingers aligned with a respective inner shroud slot.

17. The tube coupling of claim 15, the inner shroud further comprising a plurality of inner shroud flats and a plurality of inner shroud slots, wherein adjacent inner shroud flats of the plurality of inner shroud flats are separated from each other by one of the inner shroud flats of the plurality of inner shroud slots, and wherein each spring finger of the plurality of spring fingers is aligned with an inner shroud flat of the plurality of inner shroud flats.

18. The tube coupling of claim 17, wherein the band extends over the plurality of inner shroud protrusions and the plurality of spring fingers.

19. The tube coupling of claim 17, wherein each of the plurality of spring fingers comprises a spring finger flange and each of the plurality of inner shroud flats comprises an inner shroud flange.

20. The tube coupling of claim 17, wherein adjacent inner shroud protrusions of the plurality of inner shroud protrusions are separated from each other by one of the inner shroud slots of the plurality of inner shroud flats, and wherein the band comprises a plurality of band protrusions, each of the band protrusions of the plurality of band protrusions located within a respective inner shroud slot.

* * * * *